(12) United States Patent
Vasudevan et al.

(10) Patent No.: US 10,873,526 B2
(45) Date of Patent: Dec. 22, 2020

(54) FLOW AGGREGATION AND ROUTING FOR MULTI-CONNECTIVITY CLIENT DEVICES

(71) Applicant: Alcatel Lucent, Nozay (FR)

(72) Inventors: Subramanian Vasudevan, Murray Hill, NJ (US); Satish Kanugovi, Bangalore (IN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/314,509

(22) PCT Filed: Jul. 7, 2017

(86) PCT No.: PCT/EP2017/067098
§ 371 (c)(1),
(2) Date: Dec. 31, 2018

(87) PCT Pub. No.: WO2018/007591
PCT Pub. Date: Jan. 11, 2018

(65) Prior Publication Data
US 2019/0166041 A1    May 30, 2019

(30) Foreign Application Priority Data
Jul. 8, 2016  (IN) .............................. 201641023489

(51) Int. Cl.
*H04L 12/709* (2013.01)
*H04W 88/18* (2009.01)
(Continued)

(52) U.S. Cl.
CPC ............ *H04L 45/245* (2013.01); *H04L 47/41* (2013.01); *H04L 69/14* (2013.01); *H04L 69/24* (2013.01);
(Continued)

(58) Field of Classification Search
CPC ... H04L 45/24; H04L 45/245; H04L 47/2441; H04L 47/41; H04L 69/14; H04L 69/16;
(Continued)

(56) References Cited

U.S. PATENT DOCUMENTS 7,636,309 B2 *  12/2009  Alicherry ................ H04L 45/02
                                                                    370/229
8,428,024 B2 *   4/2013  Haddad .................... H04L 29/06
                                                                    370/329
(Continued)

FOREIGN PATENT DOCUMENTS

EP         3482547 A1 *  5/2019  ............. H04L 69/14
WO    WO 2014/204716 A2    12/2014
(Continued)

OTHER PUBLICATIONS

International Search Report for PCT/EP2017/067098 dated Oct. 6, 2017.
(Continued)

*Primary Examiner* — Eric Nowlin
(74) *Attorney, Agent, or Firm* — Fay Sharpe LLP (57) ABSTRACT

Aspects relating to managing flow aggregation and routing for a multi-connectivity client device are described herein. In an implementation, a method for managing flow aggregation and routing for the client device includes establishing connection with a network communication engine based on connection parameters. The method further includes exchanging communication capabilities of the client device and a multi-access bearer proxy, with the network communication engine through a predefined communication protocol. The method further includes negotiating a set of communication standards for managing flow aggregation and routing of data packets, with the network communication engine based on the exchanged communication capabilities,
(Continued)

where the set of communication standards comprises at least one flow aggregation and routing protocol.

15 Claims, 7 Drawing Sheets

(51) Int. Cl.
    *H04L 29/06* (2006.01)
    *H04W 76/15* (2018.01)
    *H04L 12/891* (2013.01)
    *H04L 12/851* (2013.01)

(52) U.S. Cl.
    CPC ......... *H04W 76/15* (2018.02); *H04W 88/182* (2013.01); *H04L 47/2441* (2013.01); *Y02D 30/50* (2020.08)

(58) Field of Classification Search
    CPC ...... H04L 69/163; H04L 69/24; H04W 76/15; H04W 88/182; Y02D 50/30
    See application file for complete search history.

(56) References Cited

U.S. PATENT DOCUMENTS

| | | | | |
|---|---|---|---|---|
| 8,576,875 | B2* | 11/2013 | Sivakumar | H04L 69/16 370/464 |
| 8,654,869 | B2* | 2/2014 | Jones | H04B 1/715 370/230 |
| 8,811,329 | B2* | 8/2014 | Haddad | H04L 29/06 370/329 |
| 8,824,480 | B2* | 9/2014 | Hampel | H04L 45/24 370/230 |
| 9,225,630 | B2* | 12/2015 | Gouache | H04L 69/14 |
| 9,455,897 | B2* | 9/2016 | Krishnaswamy | H04L 45/00 |
| RE46,195 | E* | 11/2016 | Kini | H04L 45/24 |
| 9,503,223 | B2* | 11/2016 | Wu | H04L 1/1825 |
| 9,578,109 | B2* | 2/2017 | Biswas | H04L 67/142 |
| 9,762,702 | B2* | 9/2017 | Biswas | H04W 76/10 |
| 9,843,530 | B2* | 12/2017 | Le | H04L 47/32 |
| 9,992,786 | B2* | 6/2018 | Han | H04W 72/1215 |
| 10,020,918 | B2* | 7/2018 | Walid | H04L 1/1858 |
| 10,097,475 | B2* | 10/2018 | Mildh | H04L 69/14 |
| 10,143,001 | B2* | 11/2018 | Schliwa-Bertling | H04L 69/14 |
| 10,159,101 | B2* | 12/2018 | Barrett | H04L 61/1511 |
| 10,182,131 | B2* | 1/2019 | Boucadair | H04L 69/14 |
| 10,193,781 | B2* | 1/2019 | Han | H04L 67/02 |
| 10,201,029 | B2* | 2/2019 | Kekki | H04W 76/16 |
| 10,203,882 | B2* | 2/2019 | Rayavarapu | G06F 3/061 |
| 10,299,157 | B2* | 5/2019 | Lee | H04L 45/02 |
| 10,306,025 | B2* | 5/2019 | Ripke | H04L 69/16 |
| 10,306,692 | B2* | 5/2019 | Zee | H04L 69/16 |
| 10,355,880 | B2* | 7/2019 | Hariharan | H04L 69/16 |
| 10,397,379 | B2* | 8/2019 | Paasch | H04L 69/14 |
| 10,405,365 | B2* | 9/2019 | Han | H04L 43/0864 |
| 10,433,215 | B2* | 10/2019 | Maguire | H04W 76/34 |
| 10,440,618 | B2* | 10/2019 | Kweon | H04W 36/0016 |
| 10,454,827 | B2* | 10/2019 | Hellander | H04L 69/14 |
| 10,476,992 | B1* | 11/2019 | Amdahl | H04L 69/24 |
| 10,498,868 | B2* | 12/2019 | Sridhar | H04L 69/163 |
| 10,554,793 | B2* | 2/2020 | Roeland | H04W 76/15 |
| 2008/0062879 | A1* | 3/2008 | Sivakumar | H04L 69/16 370/235 |
| 2011/0149739 | A1* | 6/2011 | Sarkar | H04W 28/08 370/235 |
| 2012/0020284 | A1* | 1/2012 | Haddad | H04L 29/06 370/328 |
| 2012/0093150 | A1* | 4/2012 | Kini | H04L 45/24 370/389 |
| 2012/0099601 | A1* | 4/2012 | Haddad | H04L 29/12405 370/401 |
| 2012/0188979 | A1* | 7/2012 | Haddad | H04W 76/23 370/331 |
| 2012/0226802 | A1* | 9/2012 | Wu | H04L 1/1825 709/224 |
| 2013/0077501 | A1* | 3/2013 | Krishnaswamy | H04L 69/14 370/252 |
| 2013/0107909 | A1* | 5/2013 | Jones | H04W 40/08 375/133 |
| 2013/0195106 | A1* | 8/2013 | Calmon | H04B 7/15521 370/389 |
| 2013/0223407 | A1* | 8/2013 | Haddad | H04L 29/06 370/331 |
| 2014/0092828 | A1* | 4/2014 | Sirotkin | H04B 17/318 370/329 |
| 2015/0201046 | A1* | 7/2015 | Biswas | H04W 76/10 370/329 |
| 2015/0215225 | A1* | 7/2015 | Mildh | H04L 69/14 370/236 |
| 2015/0288599 | A1* | 10/2015 | Zhou | H04L 45/245 370/338 |
| 2015/0350337 | A1* | 12/2015 | Biswas | H04L 67/142 709/228 |
| 2016/0212759 | A1* | 7/2016 | Schliwa-Bertling | H04L 69/14 |
| 2016/0261722 | A1* | 9/2016 | Paasch | H04L 69/163 |
| 2016/0286251 | A1* | 9/2016 | Kopka | H04N 21/23406 |
| 2016/0286441 | A1* | 9/2016 | Kweon | H04W 36/0066 |
| 2017/0063699 | A1* | 3/2017 | Kim | H04L 47/34 |
| 2017/0085484 | A1* | 3/2017 | Hellander | H04L 47/11 |
| 2017/0118787 | A1* | 4/2017 | Kekki | H04W 76/16 |
| 2017/0142233 | A1* | 5/2017 | Boucadair | H04L 69/18 |
| 2017/0156078 | A1* | 6/2017 | Lee | H04L 45/125 |
| 2017/0163774 | A1* | 6/2017 | Boucadair | H04L 69/163 |
| 2017/0171098 | A1* | 6/2017 | Le | H04L 47/40 |
| 2017/0181211 | A1* | 6/2017 | Han | H04L 47/193 |
| 2017/0187497 | A1* | 6/2017 | Walid | H04L 1/1858 |
| 2017/0188407 | A1* | 6/2017 | Zee | H04L 69/14 |
| 2017/0223148 | A1* | 8/2017 | Roeland | H04L 12/66 |
| 2017/0230200 | A1* | 8/2017 | Hariharan | H04L 12/4633 |
| 2017/0290036 | A1* | 10/2017 | Han | H04W 72/1215 |
| 2017/0302549 | A1* | 10/2017 | Han | H04W 28/08 |
| 2017/0318130 | A1* | 11/2017 | Ripke | H04L 69/16 |
| 2017/0318484 | A1* | 11/2017 | Lindheimer | H04W 40/02 |
| 2017/0339219 | A1* | 11/2017 | Le | H04L 69/163 |
| 2017/0339727 | A1* | 11/2017 | Barrett | H04L 61/2007 |
| 2017/0346724 | A1* | 11/2017 | Calin | H04L 45/24 |
| 2017/0374584 | A1* | 12/2017 | Maguire | H04W 76/34 |
| 2018/0014346 | A1* | 1/2018 | Gupta | H04W 28/18 |
| 2018/0027097 | A1* | 1/2018 | Boucadair | H04L 69/14 370/401 |
| 2018/0054847 | A1* | 2/2018 | Cariou | H04W 28/08 |
| 2018/0062979 | A1* | 3/2018 | Zee | H04W 80/06 |
| 2018/0103123 | A1* | 4/2018 | Skog | H04L 67/142 |
| 2018/0206284 | A1* | 7/2018 | Zhou | H04W 28/06 |
| 2018/0234335 | A1* | 8/2018 | Sridhar | H04L 69/163 |
| 2019/0373662 | A1* | 12/2019 | Gupta | H04W 76/16 |

FOREIGN PATENT DOCUMENTS

WO    WO 2016/034245 A1    3/2016
WO    WO-2018007591 A1 *    1/2018    ............ H04L 47/41

OTHER PUBLICATIONS

Leymann C. Heidemann, Huawei's GRE Tunnel Bonding Protocol; draft zhang-GRE tunnel-bonding-03.txr, Deutsche Telekon AG, Internet Engineering Task Force, May 23, 2016.

* cited by examiner

FLOW AGGREGATION AND ROUTING FOR MULTI-CONNECTIVITY CLIENT DEVICES

FIELD OF INVENTION

The present subject matter relates to multi-connectivity client devices (MCCD) and, particularly, but not exclusively, to managing flow aggregation and routing for MCCD.

BACKGROUND

A communication environment includes multiple communication networks to allow different communication devices to communicate with each other. A communication network, within the communication environment, typically provides communication services, such as transmission of data packets, between network elements, such as an access node, and network terminals, such as a user equipment (UE). In order to provide such communication services, the communication network includes an access network, and a core network associated with such access network.

SUMMARY

This summary is provided to introduce concepts related to flow aggregation and routing between a multi-connectivity client device (MCCD) and an access node and vice-versa, in a communication network. This summary is not intended to identify essential features of the claimed subject matter nor is it intended for use in determining or limiting the scope of the claimed subject matter.

In an example implementation of the present subject matter, a method for managing flow aggregation and routing for a MCCD is described. The method includes establishing connection with a network communication engine (NCE) based on connection parameters, where the NCE manages at least one multi-access bearer proxy (MABP), and wherein a MABP handles uplink and downlink data packet routing of the MCCD. The method further includes exchanging communication capabilities of the MCCD and the MABP, with the NCE through a predefined communication protocol. The method also includes negotiating a set of communication standards for managing flow aggregation and routing of data packets, with the NCE based on the exchanged communication capabilities, where the set of communication standards comprises at least one flow aggregation and routing protocol.

In another implementation of the present subject matter, a method for managing flow aggregation and routing for MCCD includes establishing connection with a client communication engine (CCE), where the CCE manages uplink and downlink data packet routings of the MCCD. The method also includes exchanging communication capabilities of a MABP corresponding to the MCCD and communication capabilities of the MCCD, with the CCE through a predefined communication protocol. The method further includes negotiating a set of communication standards for managing flow aggregation and routing of data packets, with the CCE based on the exchanged communication capabilities, where the set of communication standards comprises at least one flow aggregation and routing protocol.

In an aspect of the present subject matter, a multi connectivity client device (MCCD) is described. The MCCD includes a processor and a client communication engine (CCE) coupled to the processor. The CCE is to establish a connection with a network communication engine (NCE) based on connection parameters, wherein the NCE manages at least one multi-access bearer proxy (MABP), and wherein a MABP handles uplink and downlink data packet routing of the MCCD. The CCE is to also exchange communication capabilities of the MCCD and the MABP, with the NCE through a predefined communication protocol; and negotiate a set of communication standards for managing flow aggregation and routing of data packets, with the NCE based on the exchanged communication capabilities, where the set of communication standards comprises at least one flow aggregation and routing protocol.

In another implementation of the present subject matter, a Network communication Engine (NCE) is described. The NCE includes a NCE processor, and a communication module coupled to the NCE processor. The communication module, in one implementation is to establish a connection with a client communication engine (CCE), wherein the CCE manages uplink and downlink data packet routings of the MCCD. The communication module is to further exchange communication capabilities of the MABP and the MCCD, with the CCE through a predefined communication protocol. The NCE also includes a negotiating module coupled to the processor, the negotiating module is to negotiate a set of communication standards for managing flow aggregation and routing of data packets with the CCE based on the exchanged communication capabilities, wherein the set of communication standards comprises at least one flow aggregation and routing protocol.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some implementations of system and/or methods in accordance with implementations of the present subject matter are now described, by way of example only, and with reference to the accompanying figures, in which.

DESCRIPTION OF IMPLEMENTATIONS

While communicating in a communication environment, network terminals, such as a user equipment (UE) generally connect to a communication network and exchange data through established uplink and downlink channels. However, in order to allow fast uplink and downlink of data packets, network terminals such as multi-connectivity client devices (MCCD) can connect simultaneously to multiple communication networks, by utilizing a multi-access bearer proxy (MABP). For example, a MCCD may be simultaneously connected to a cellular network, and a Wireless network (WLAN), and exchange data. The MABP may allow bearer traffic forwarding across multiple communication networks and may accordingly handle uplink and downlink data packet routing of the MCCD.

While being connected to multiple communication networks, a MCCD may utilize any combination of available access networks and core networks to establish uplink and downlink channels, and communicate with other network terminals. However, while simultaneously communicating with multiple communication networks, a predefined set of communication standards for integration of the multiple communication networks, and establishing uplink and downlink channels, is necessitated.

Although multiple communication standards including different flow aggregation and routing protocols, like Generic Routing Encapsulation (GRE) tunneling protocol, Multipath Transmission Protocol (TCP) (MPTCP), etc., are known; use of different set of communication standards by the MABP and the MCCD may hinder establishment of uplink and downlink channels through different communication networks, and may lead to communication failure between the MABP and the MCCD.

Approaches for flow aggregation and routing for multi-connectivity client devices are described. According to an example implementation of the present subject matter, techniques of managing flow aggregation and routing for MCCD are described. In an example implementation of the present subject matter, the MCCD may communicate with network communication engine (NCE) to negotiate a set of communication standards, including flow aggregation and routing protocols, and select a combination of available access and core networks to establish uplink and downlink channels. The negotiated set of set of communication standards may allow the MCCD and the MABP to communicate based on a common communication protocol, and may allow management of flow aggregation and routing for the MCCD.

The MCCD may include a client communication engine (CCE) and the communication networks may include multiple NCEs. The NCEs may be implemented in access network, or in core network of each communication network. In an example implementation, the NCE may be included as a sub-unit of an access node corresponding to an access network of a communication network.

In operation, each NCE may manage one or more MABPs such that the one or more MABPs may establish successful communication with corresponding MCCDs. In an example implementation, a MABP corresponding to a MCCD may handle uplink and downlink data packet routing of the MMCD to manage flow aggregation and routing of data packets between the MCCD and the communication networks. As discussed earlier, the MCCD may be connected with multiple communication networks, such as long term evolution (LTE), WLAN, and MuLTEFire. and the MABP may allow aggregating and routing of data packets from one or more such communication networks to the MCCD.

In an example implementation of the present subject matter, the CCE may choose a NCE from amongst multiple NCEs to establish a connection, based on connection parameters, such as link quality between the MCCD and the NCE, distance between the MCCD and the NCE, etc. In another example, a NCE from amongst the multiple NCEs may also be pre-provisioned with the CCE for establishing a connection.

Upon establishing a connection with the NCE, the CCE and the NCE may exchange communication capabilities with each other. The CCE may share the communication capabilities of the MCCD with the NCE, while the NCE may share the communication capabilities of the MABP corresponding to the MCCD, with the CCE. In an example, the communication capabilities may include exchange of choice of a flow aggregation and routing protocol. The CCE and NCE may also exchange available network links and paths, and link quality of available network links and paths between the MCCD and the access nodes.

In an example implementation of the present subject matter, upon exchanging the communication capabilities, the CCE and NCE may negotiate a set of communication standards for communication between the MCCD and the MABP. In an example, the set of communication standards may include at least one flow aggregation and routing protocol. In another example, the set of communication standards may also include a configuration mode, defining a combination of access network and core network to be utilized for routing of data packets.

Therefore, the above described techniques may allow the NCE and the CCE to negotiate a set of communication standards, which may allow the MABP to manage flow aggregation and routing for the MCCD by establishing uplink and downlink channels with different communication networks. Further, the implementation of the above described techniques may allow establishment of a common flow aggregation and routing protocol between the MCCD and the MABP, to facilitate effective and seamless multi-network communication.

The manner in which the aspects managing flow aggregation and routing for MCCD shall be implemented has been explained in detail with respect to the FIG. 1 to FIG. 7. While aspects of the present subject matter may be implemented in any number of different computing systems, transmission environments, and/or configurations, the implementations are described in the context of the following system(s) as examples.

Figure 1:
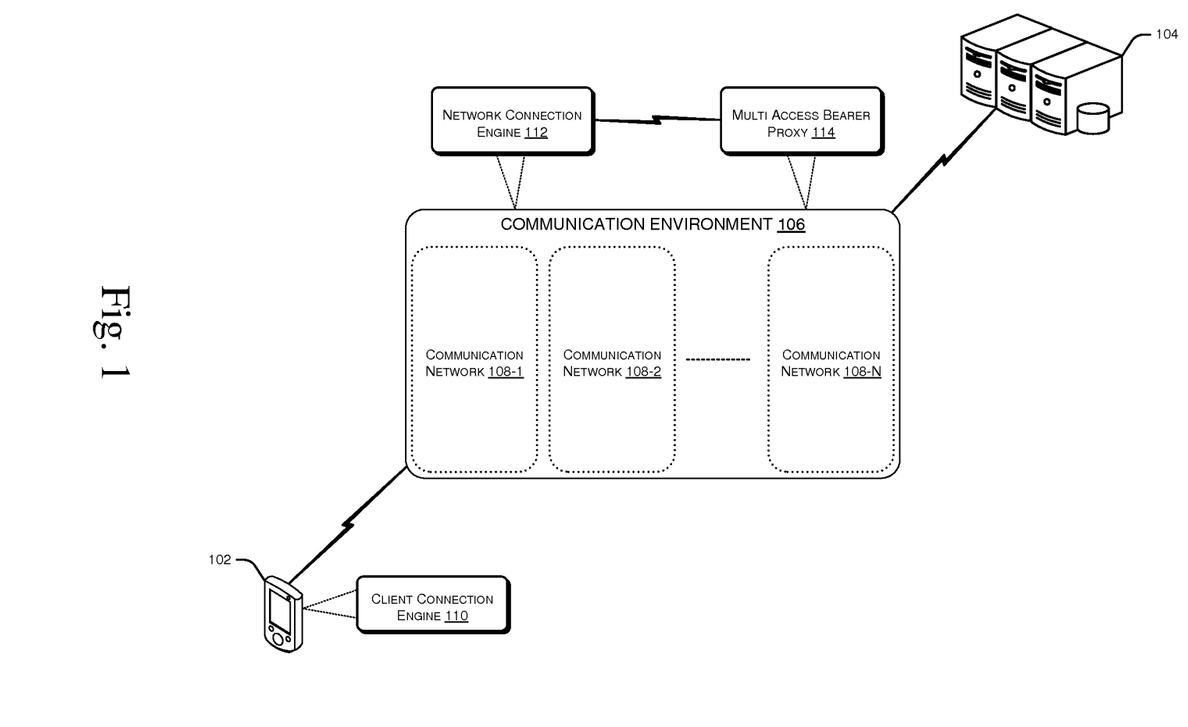
FIG. 1 illustrates a multi-connectivity client device, communicating through a communication environment, according to an implementation of the present subject matter.

FIG. 1 illustrates an environment 100 for managing flow aggregation and routing for a multi-connectivity client device (MCCD) 102, according to an implementation of the present subject matter. The MCCD 102 may communicate with a target terminal 104, through a communication environment 106.

In an example, the MCCD 102 may be a user equipment (UE) carrying out communications with multiple communication networks 108-1, 108-2, . . . , 108-N within the communication environment 106. For the ease of explanation, the communication networks 108-1, 108-2, . . . , 108-N have been collectively referred to as communication networks 108, and individually referred to as a communication network 108, hereinafter.

The MCCD 102 may include any UE, such a desktop computers, handheld computing devices, laptops portable computers, network computers, or wireless handheld devices, such as mobile phones, personal digital assistant (PDA), smart phones dash top mobiles, and multi-media enabled phones, which are capable of simultaneously communicating with multiple communication networks 108.

In an example, the target terminal 104 may be a server, hosting an application, with which the MCCD 102 may establish communication to access and exchange data. In an example, the target terminal 104 may be implemented as a central directory server, a database server, a web server, or an application server.

Each of the communication networks 108 may be a wireless or a wired network, or a combination thereof. The communication network 108 may be a collection of individual networks, interconnected with each other and functioning as a single large network, for example, the internet or an intranet. Few or all of the communication networks 108 may be implemented as one of the different types of networks, such as local area network (LAN), wide area network (WAN). Wireless Local Area Network (WLAN), and such. The communication network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other.

In one example, the MCCD 102 may use General Packet Radio Service (GPRS) along with other communication networks 108 for communicating with the target terminal 104. In addition, few or all of the communication networks 108 may be implemented as individual networks including, but are not limited to, 3GPP Long Term Evolution (LTE). Global System for Mobile Communication (GSM) network, Universal Mobile Telecommunications System (UMTS) network. Personal Communications Service (PCS) network, Time Division Multiple Access (TDMA) network, Code Division Multiple Access (CDMA) network, Next Generation Network (NGN), IP-based network, Public Switched Telephone Network (PSTN), and Integrated Services Digital Network (ISDN). In other words, the communication networks 108 may include cellular telecommunication networks, wired networks, or wireless networks other than cellular telecommunication networks, or a mix thereof.

In an example implementation of the present subject matter, the MCCD 102 may include a client connection engine (CCE) 110. The CCE 110 may manage uplink and downlink data packet routings of the MCCD 102. In other words, the CCE 110 may manage multiple connections of the MCCD 102 with different communication networks 108, and may enable exchange of data through such different communication networks 108. In an example implementation of the present subject matter, the CCE 110 may communicate with a network connection engine (NCE) 112, to manage flow aggregation and routing for the MCCD 102. The NCE 112 may either be implemented as a network entity of the communication environment 106, or may be implemented along with another network entity of the communication environment 106.

In an example, each communication network 108 may implement one or more NCEs to communicate with CCEs of different MCCDs. For example, the communication network 108-1 may implement a NCE in its access network and the communication network 108-2 may implement a NCE in its core network. In another example, the communication network 108-3 may implement the NCE as a sub-unit within an access node of its access network. Accordingly, it would be appreciated that the communication environment 106 may include multiple NCEs.

The NCE 112, in an example implementation of the present subject matter, may communicate with, and manage a multi-access bearer proxy (MABP) 114. It would be appreciated that the MABP 114 may handle uplink and downlink data packet routing of the MCCD 102, to enable the MCCD 102 to simultaneously communicate with multiple communication networks 108. While the NCE 112 has been shown to communicate with a single MABP 114, it would be appreciated that NCE 112 may communicate, and manage multiple MABPs 114.

The MABP 114 may be implemented as a network entity within the communication environment 106, or may be implemented as a sub-unit of a network entity within the communication environment 106. For example, the communication network 108-1 may implement a MABP in its access network and the communication network 108-3 may implement a MABP in its core network as individual network entities. In another example, the communication network 108-2 may implement the MABP as a sub-unit within an access node of its access network. Accordingly, it would be noted that the communication environment 106 may include multiple MABPs.

Figure 3:
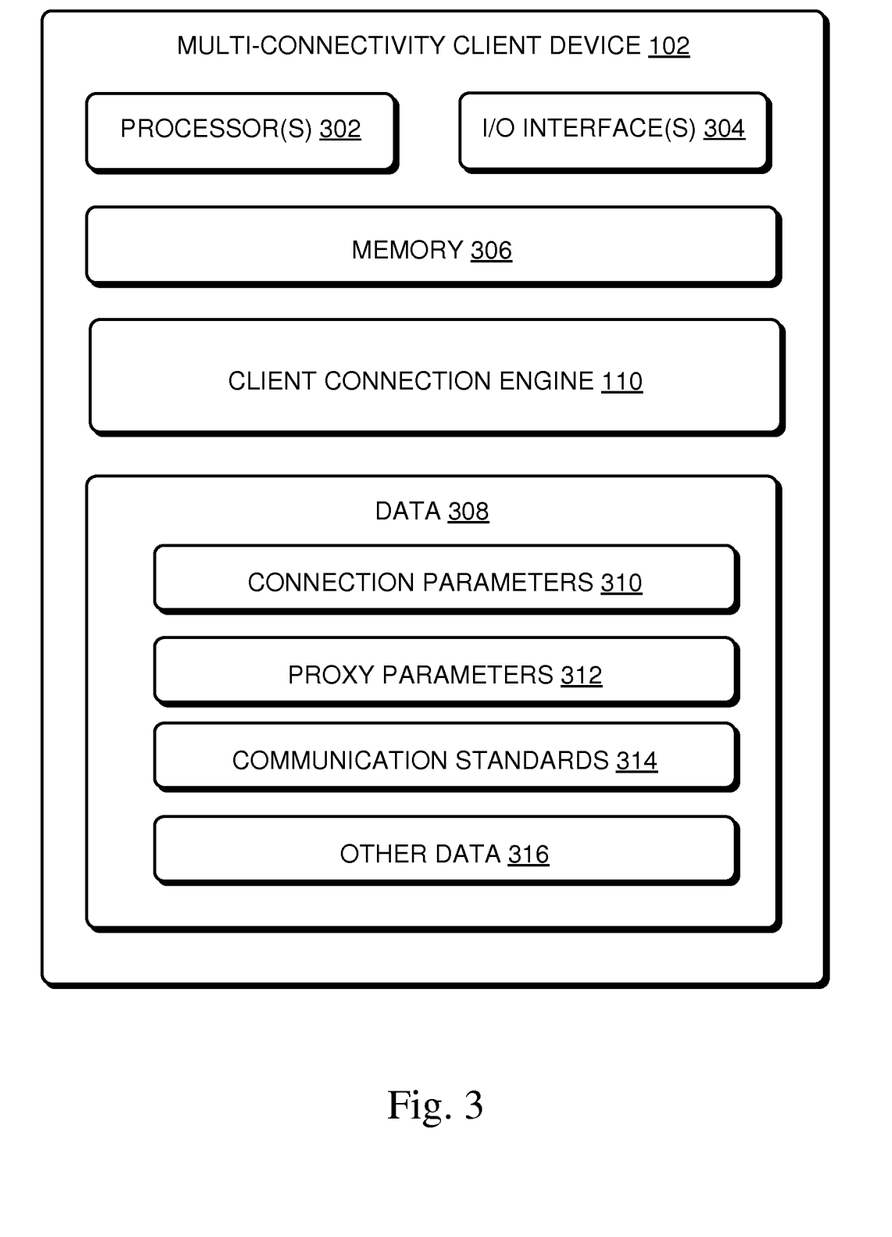
FIG. 3 schematically illustrates a multi-connectivity client device, according to an implementation of the present subject matter.
Figure 4:
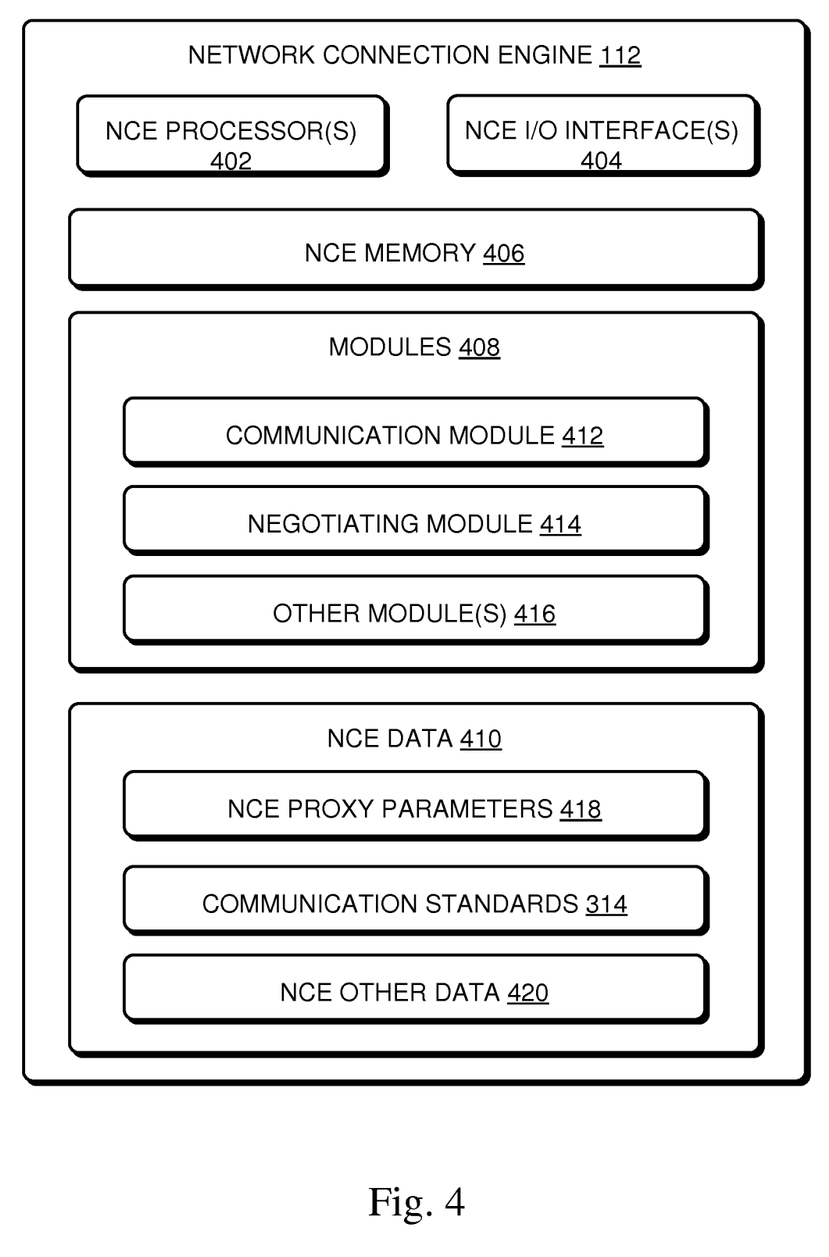
FIG. 4 schematically illustrates a network connection engine (NCE), according to an implementation of the present subject matter

As described earlier, the MABP 114 may handle uplink and downlink data packet routing of the MCCD 102 to allow the MCCD 102 to communicate with multiple communication networks 108. In an example implementation of the present subject matter, the CCE 110 may communicate with the NCE 112 to negotiate set of communication standards based on which a common flow aggregation and routing protocol may be established between the MCCD 102 and the MABP 114. The manner in which the CCE 110 communicates with the NCE 112, and other implementation details have been further described in reference with FIG. 2. FIG. 3, and FIG. 4.

Figure 2:
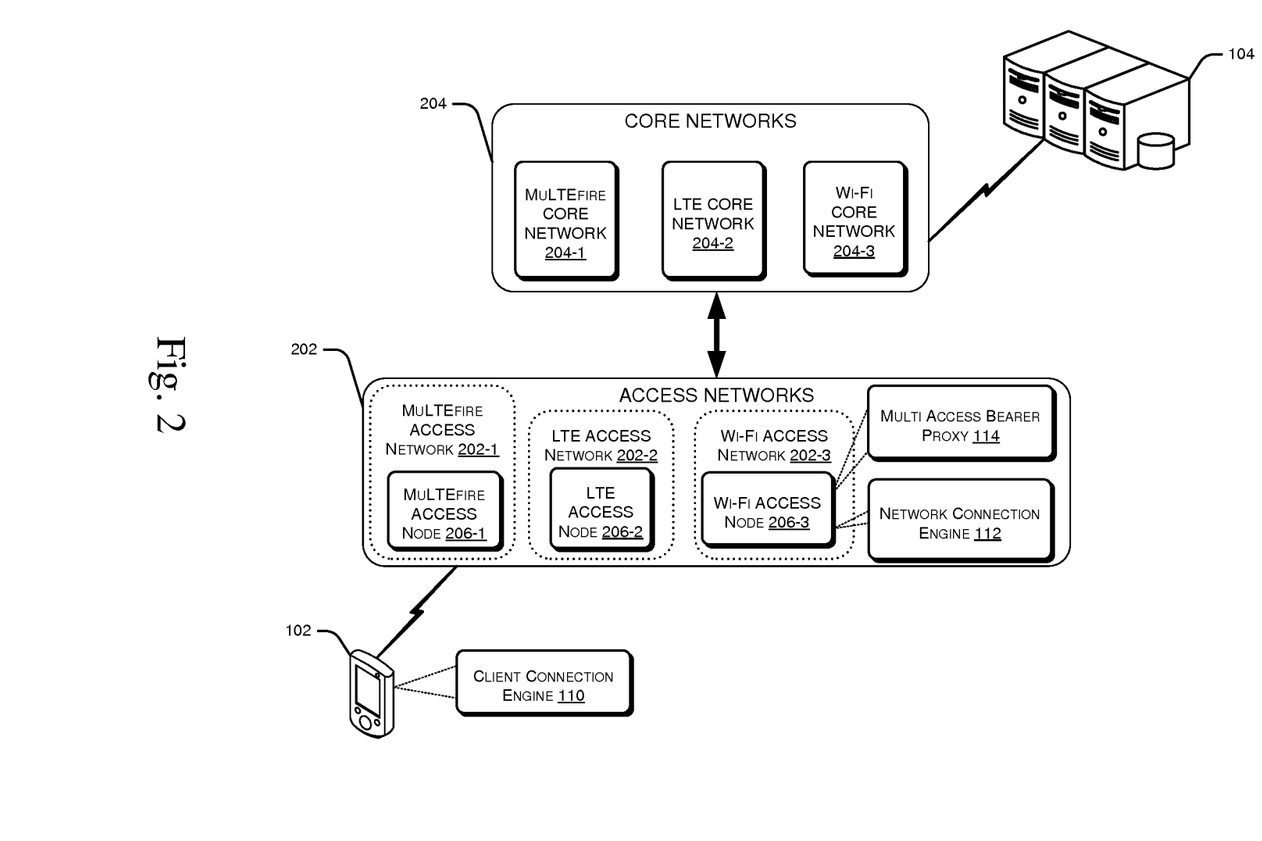
FIG. 2 illustrates a multi-connectivity client device, communicating through a communication environment, according to an implementation of the present subject matter.

FIG. 2 illustrates the MCCD 102 communicating with the target terminal 104, according to an implementation of the present subject matter. In an example implementation of the present subject matter, the MCCD 102 may communicate with the target terminal 104 through a combination of different access networks 202 and core networks 204.

The access networks 202 of the present subject matter may form a sub-part of the communication networks 108, and may provide direct connectivity between network terminals and core networks of the communication networks 108, such as the core networks 204. In an example implementation of the present subject matter, the access networks 202 may be a cluster of multiple access networks, such as MuLTEfire access network 202-1, LTE access network 202-2, and Wi-Fi access network 202-3. Similarly, the core networks 204 may be a cluster of multiple core networks, such as MuLTEfire core network 204-1, LTE core network 204-2, and Wi-Fi core network 204-3.

It would be appreciated that the LTE access network 202-2 and the LTE core network 204-2 may commonly form a LTE communication network. Similarly, the MuLTEfire access network 202-1 and the MuLTEfire core network 204-1 may commonly form a MuLTEfire communication network; and the Wi-Fi access network 202-3 and the Wi-Fi core network 204-3 may commonly form a Wi-Fi communication network.

In an example implementation of the present subject matter, each access network 202, such as the MuLTEfire access network 202-1, the LTE access network 202-2, and the Wi-Fi access network 202-3 may include different access nodes, such as MuLTEfire access node 206-1, LTE access node 206-2, and Wi-Fi access node 206-3, respectively. The access nodes may provide last mile connectivity to the network terminals, such as the MCCD 102. For the ease of explanation, the access networks 202 have been individually referred to as access network 202.

It would be appreciated that each access network 202, such as the MuLTEfire access network 202-1, the LTE access network 202-2, and the Wi-Fi access network 202-3 would include multiple access nodes. However, for the ease of explanation, one access node has been described within each of the access networks 202, respectively. Further, the access nodes, such as the MuLTEfire access node 206-1, LTE access node 206-2, and Wi-Fi access node 206-3 have been collectively referred to as access nodes 206, and individually referred to as access node 206, hereinafter.

In an implementation, the NCE 112 may be implemented as a sub-unit of an access node. For example, the NCE 112 may be implemented as a sub-unit of Wi-Fi access node 206-3. Further, the MABP 114 may also be implemented as a sub-unit of the Wi-Fi access node 206-3. Similarly, the NCE 112 and the MABP 114 may also be implemented as sub-units of other access nodes 206, although not shown for the ease of explanation. It would be appreciated that the NCE 112 and the MABP 114 may also be implemented as individual network entities, within any of the communication networks 108. However, for the ease of explanation, the NCE 112 and the MABP 114 have been described to be implemented as sub-units of the Wi-Fi access node 206-3.

It would be appreciated that the access networks 202 and the core networks 204 may implement different network entities, such as including routers, bridges, gateways, computing devices, and storage devices, depending on the technology; however, such details have been omitted for the sake of brevity.

In operation, the CCE 110 associated with the MCCD 102 may communicate with the NCE 112 and negotiate a set of communication standards to manage flow aggregation and routing for the MCCD 102. The various components of the MCCD 102 and NCE 112 communicating with each other to manage the flow aggregation and routing of data packets, have been further described in reference to FIG. 3 and FIG. 4.

FIG. 3 schematically illustrates the MCCD 102, in accordance with an implementation of the present subject matter. In an implementation, MCCD 102 may include one or more processor(s) 302, I/O interface(s) 304, and a memory 306 coupled to the processor(s) 302. The processor(s) 302 can be a single processing unit or a number of units, all of which could include multiple computing units. The processor(s) 302 may be implemented as one or more microprocessors, microcomputers, microcontrollers, digital signal processors, central processing units, state machines, logic circuitries, and/or any devices that manipulate signals based on operational instructions. Among other capabilities, the processor(s) 302 is configured to fetch and execute computer-readable instructions and data stored in the memory 306.

The I/O interface(s) 304 may include a variety of software and hardware interfaces, for example, interfaces for peripheral device(s), such as a keyboard, a mouse, a display unit, an external memory, and a printer. Further, the I/O interface(s) 304 may enable MCCD 102 to communicate with other devices, and other external databases (not shown). The I/O interface(s) 304 can facilitate multiple communications within a wide variety of networks and protocol types, including wired networks, for example, local area network (LAN), cable, etc., and wireless networks, such as Wireless LAN (WLAN), cellular network, or satellite. For this purpose, the I/O interface(s) 304 include one or more ports for connecting a number of computing systems with one another or to a network. The I/O interface(s) 304 may also allow the MCCD 102 to simultaneously connect to multiple communication networks 108.

The memory 306 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, MCCD 102 also include the Client Connection Engine (CCE) 110 and data 308.

The CCE 110, amongst other things, may include routines, programs, objects, components, data structures, etc., which perform particular tasks or implement data types. The CCE 110 may also be implemented as, signal processor(s), state machine(s), logic circuitries, and/or any other devices or components that manipulate signals based on operational instructions. Further, the CCE 110 can be implemented in hardware, instructions executed by a processing unit, or by a combination thereof. The processing unit can comprise a computer, a processor, such as the processor(s) 302, a state machine, a logic array, or any other suitable devices capable of processing instructions. The processing unit can be a general-purpose processor which executes instructions to cause the general-purpose processor to perform the relevant tasks or, the processing unit can be dedicated to perform the relevant functions.

In another aspect of the present subject matter, the CCE 110 may be machine-readable instructions, firmware or software, which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via the communication networks 108.

The data 308 serves, amongst other things, as a repository for storing data processed, received, and generated by the CCE 110. The data 308 includes connection parameters 310, proxy parameters 312, communication standards 314, and other data 316. The other data 316 includes data generated as a result of the execution of CCE 110.

FIG. 4 schematically illustrates the NCE 112, in accordance with an implementation of the present subject matter. In an implementation, the NCE 112 may include one or more NCE processor(s) 402, NCE I/O interface(s) 404, and a NCE memory 406 coupled to the NCE processor(s) 402. The NCE processor(s) 402 can be a single processing unit or a number of units, all of which could include multiple computing units. The NCE processor(s) 402 may be implemented as one or more microprocessors, microcomputers, microcontrollers, digital signal processors, central processing units, state machines, logic circuitries, and/or any devices that manipulate signals based on operational instructions. Among other capabilities, the NCE processor(s) 402 is configured to fetch and execute computer-readable instructions and data stored in the NCE memory 406.

The NCE I/O interface(s) 404 may include a variety of software and hardware interfaces, for example, interfaces for peripheral device(s), such as a keyboard, a mouse, a display unit, an external memory, and a printer. Further, the NCE I/O interface(s) 404 may enable the NCE 112 to communicate with other devices, and other external databases (not shown). The NCE I/O interface(s) 404 can facilitate multiple communications within a wide variety of networks and protocol types, including wired networks, for example, local area network (LAN), cable, etc., and wireless networks, such as Wireless LAN (WLAN), cellular network, or satellite. For this purpose, the NCE I/O interface(s) 404 include one or more ports for connecting a number of computing systems with one another or to a network. The NCE I/O interface(s) 404 may also allow the NCE 112 to connect to the MABP 114.

The NCE memory 406 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation. NCE 112 also includes module(s) 408 and NCE data 410.

The module(s) 408, amongst other things, may include routines, programs, objects, components, data structures, etc., which perform particular tasks or implement data types. The module(s) 408 may also be implemented as, signal processor(s), state machine(s), logic circuitries, and/or any other devices or components that manipulate signals based on operational instructions. Further, the module(s) 408 can be implemented in hardware, instructions executed by a processing unit, or by a combination thereof. The processing unit can comprise a computer, a processor, such as the NCE processor(s) 402, a state machine, a logic array, or any other suitable devices capable of processing instructions. The processing unit can be a general-purpose processor which executes instructions to cause the general-purpose processor to perform the relevant tasks or, the processing unit can be dedicated to perform the relevant functions.

In another aspect of the present subject matter, the module(s) 408 may be machine-readable instructions, firmware or software, which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via the communication networks 108.

In an example, the module(s) 408, amongst other things, may include a communication module 412, a negotiating module 414, and other modules 416. Further, the NCE data 410 serves, amongst other things, as a repository for storing data processed, received, and generated by the NCE 112. The NCE data 410 includes NCE proxy parameters 418, the communication standards 314, and NCE other data 420. The NCE other data 420 includes data generated as a result of the execution of the NCE 112.

For the ease of explanation, the communication between the CCE 110 of the MCCD 102, and the NCE 112 has been explained with the help of components of the MCCD 102 and NCE 112 described in FIG. 3 and FIG. 4, along with the different entities described in FIG. 2.

In operation, the CCE 110 of the MCCD 102 may communicate with the NCE 112 through the communication networks 108. As described in FIG. 2, the NCE 112 may be implemented in the access node 206. Therefore, the CCE 110 of the MCCD 102 may communicate with the access node 206 and may establish a connection with the NCE 112. In an example implementation of the present subject matter, the CCE 110 may choose the NCE 112, with which the connection is to be established, based on connection parameters 310. The connection parameters 310 may allow the CCE 110 to choose the NCE 112 from amongst the multiple NCEs within the communication networks 108.

In an example, the connection parameters 310 may include parameters, such as link quality between the MCCD 102 and the NCE 112, distance of the NCE 112 from the MCCD 102. For example, the communication networks 108 may include 5 different NCEs. The CCE 110 may determine link quality between the MCCD 102 and each of the 5 NCEs along with the distance between the MCCD 102 and each of NCEs. Based on the computation of values for the connection parameters 310, the CCE 110 may then determine one NCE from amongst the 5 NCEs to establish connection with. In an example, the NCE with best link quality and least distance from the MCCD 102 may be chosen. In another example, the NCE with best link quality, irrespective of the distance form MCCD 102, may be chosen to establish a connection. Therefore, it would be appreciated that the choice of the NCE 112 may be based on the connection parameters 310.

In another example, the connection parameters 310 may include pre-provisioned network address of the NCE 112 based on which the CCE 110 may communicate with the NCE 112. In the above example, the network address of $2^{nd}$ NCE from amongst the 5 NCEs may be pre-provisioned and included in the connection parameters 310. In an implementation, the CCE 110 may communicate with the Wi-Fi access node 206-3 to communicate and establish a connection with the NCE 112. As described earlier, although the NCE 112 has been implemented in the Wi-Fi access node 206-3, the NCE 112 may be implemented as an independent network entity. In such scenarios, the CCE 110 may directly establish a connection with the NCE 112.

It would be appreciated that the CCE 110 and the NCE 112 may exchange multiple messages and may perform a handshake, and exchange data, such as Internet Protocol (IP) address of each other, to establish a secure connection between each other. In an example, the communication module 412 of the NCE 112 and the CCE 110 of the MCCD 102 may establish the secure connection between each other by exchanging messages in a predefined communication protocol, such as the XML. The CCE 110 may exchange XML messages with the NCE 112 through user plane data, in an example implementation.

Upon establishing a connection between the CCE 110 and the NCE 112, the CCE 110 and the communication module 412 of the NCE 112 may exchange communication capabilities with each other. The communication module 412 may share the communication capabilities of the MCCD 102, while the communication module 412 of the NCE 112 may share the communication capabilities of the MABP 114. As described earlier, the MABP 114 may handle the uplink and the downlink data packet routing of the MCCD 102 to manage the flow aggregation and routing for the MCCD 102.

In an example, the CCE 110 may communicate the choices of flow aggregation and routing protocols through the communication of the communication capabilities, based on which the MCCD 102 may wish to communicate with multiple communication networks 108. For example, the MCCD 102 may support 3 different flow aggregation and routing protocols, including the GRE tunneling protocol and the MPTCP for flow aggregation and routing. In an example, the CCE 110 may either communicate with all the 3 flow aggregation and routing protocols as the choice of communication, or may select one preferred flow aggregation and routing protocol, and share the same with the communication module 412.

The CCE 110 may also communicate other parameters, such as available network links and available network paths, link quality of available networks and link quality of available network paths, along with the communication capabilities. The CCE 110 may also communicate different available configuration modes indicating a combination of available access networks 202 and available core networks 204. In an example implementation of the present subject matter, the NCE 112 may share the parameters received from the CCE 110, with the MABP 114, to enable the MABP 114 in managing flow aggregation and routing of data packets.

Similar to the communication of communication capabilities of the MCCD 102, by the CCE 110, the communication module 412 may also communicate the communication capabilities of the MABP 114 with the CCE 110. In the above example, the MABP 114 may merely support the GRE tunneling protocol for the flow aggregation and routing of data packets. Accordingly, the communication module 412 may share the choice of GRE tunneling protocol as the flow aggregation and routing protocol with the CCE 110.

In an example implementation of the present subject matter, based on the shared communication capabilities, the CCE 110 and the NCE 112 may negotiate a set of communication standards 314.

In an example, the set of communication standards 314 may include a flow aggregation and routing protocol negotiated between the CCE 110 and the negotiating module 414. The negotiated flow aggregation and routing protocol may be utilized by the MABP 114 and the CCE 110, for managing flow aggregation and routing of data packets for the MCCD 102, while the MCCD 102 communicates with multiple communication networks 108.

As described in the above example, the MCCD 102 may support 3 different flow aggregation and routing protocols, including the GRE tunneling protocol and the MPTCP. However, the MABP 114 may merely support the GRE tunneling protocol. Therefore, in such scenario, the CCE 110 and the negotiating module 414 may negotiate the GRE tunneling protocol as a part of the set of communication standards 314.

In another example, while the MCCD 102 may support 3 different flow aggregation and routing protocols, the MABP 114 may support more than 5 flow aggregation and routing protocols, including both the GRE tunneling protocol and the MPTCP. In such scenario, the CCE 110 and negotiating module 414 may negotiate a flow aggregation and routing protocol from amongst the common 3 flow aggregation and routing protocols. The selection of the flow aggregation and routing protocol may be completed based on various different factors, such as link quality, and flow aggregation and routing protocol preference of the MCCD 102 and the MABP 114.

Apart from the flow aggregation and routing protocols, the set of communication standards 314 may also include a negotiated configuration mode. The configuration mode may define a combination of access networks 202 and core networks to be utilized by the MCCD 102, for communicating with the target terminal 104. For example, the configuration mode may define a combination of LTE access network 202-2 and LTE core network 204-2 for uplink establishment, but may define the LTE core network 204-2 along with the LTE access network 202-2 and Wi-Fi access network 202-3 for downlink establishment.

The communication module 412 of the NCE 112 may communicate the set of communication standards 314 negotiated with the MABP 114. Based on the communication of the set of communication standards 314, the MABP 114 may be made aware of the flow aggregation and routing protocol to be utilized for the flow aggregation and routing of data packets for the MCCD 102, along with the configuration mode to be utilized for the establishment of the uplink and downlink channels for the MCCD 102.

In an example implementation of the present subject matter, based on the set of communication standards 314, the MABP 114 may handle establishment of the uplink and downlink channels for the MCCD 102. It would be appreciated that the uplink channel may include different combination of access networks 202 and core networks 204, and the downlink channel may include different combination of access networks 202 and core networks 204.

In an implementation, the communication module 412 of the NCE 112 may also communicate MABP details with the CCE 110. The MABP details may include information related to the MABP 114, such the network address of the MABP 114, flow aggregation and routing protocol setup details associated with the MABP 114, and distribution policy associated with the MABP 114. The MABP details may enable the CCE 110 to directly establish a connection with the MABP 114.

Along with the communication of the MABP details, the communication module 412 of the NCE 112 may also share proxy parameters 312 with the CCE 110. The proxy parameters 312 may be based on the set of communication standards 314 negotiated between the CCE 110 and NCE 112. The value corresponding to the proxy parameters 312 may allow the CCE 110 to establish connection with the MABP 114. In an example implementation, the NCE 112 may include multiple NCE proxy parameters 418 corresponding to different flow aggregation and routing protocols and different configuration modes. Therefore, based on the negotiated set of communication standards 314, the communication module 412 may communicate a sub-set of proxy parameters 312 to the CCE 110. In an example, the proxy parameters 312 may include, but not limited to, access and core network path mapping to protocol specific header fields, transport protocols supported like Transmission Control Protocol (TCP) and/or User Datagram Protocol (UDP), security protocols used and associated keys.

In an example implementation of the present subject matter, the CCE 110 may establish a connection with the MABP 114 based on the MABP details and the proxy parameters 312. The CCE 110 may share the values corresponding to the proxy parameters 312, such that the uplink and the downlink of the MCCD 102 may be established based on the negotiated set of communication standards 314.

Therefore, the above described techniques may be utilized by the MCCD 102 and the NCE 112 to communicate with each other and negotiate a set of communication standards 314. The set of communication standards 314 may be utilized by the MCCD 102 and the MABP 114 to establish uplink and downlink channels for the MCCD 102, and manage flow aggregation and routing for the MCCD 102.

In an illustrative example of the present subject matter, for the MCCD 102 to communicate with multiple communication networks 108, the set of communication standards 314 is negotiated between the MCCD 102 and the NCE 112. The CCE 110 of the MCCD 102 may communicate with different components of the NCE 112 and may exchange communication capabilities of the MCCD 102. The NCE 112 may also share communication capabilities of the MABP 114, identified to handle uplink and downlink data packet routing of the MCCD 102, and manage flow aggregation and routing of data packets for the MCCD 102.

Further, based on the exchanged communication capabilities, the CCE 110 and the NCE 112 may negotiate the set of communication standards 314. The NCE 112 may communicate the negotiated set of communication standards 314 to the MABP 114 and may share proxy parameters 312 with the CCE 110. The set of communication standards 314, and the proxy parameters 312 may allow the MABP 114 and the CCE 110, respectively, to establish uplink and downlink channels for the MCCD 102.

In an example the NCE 112 may also share MABP details with the CCE 110 to allow the CCE 110 to directly communicate with the MABP 114. The CCE 110 may also establish a connection corresponding to the flow aggregation and routing protocol negotiated between the CCE 110 and NCE 112.

The CCE 110 may directly communicate with the MABP 114 and based on the proxy parameters 312, and the set of communication standards 314, may establish uplink and downlink channels for the MCCD 102. The MABP 114 may handle uplink and downlink data packet routing of the MCCD 102, based on the set of communication standards 314 and the proxy parameters 312. Further, the MABP 114 and the CCE 110 may utilize the flow aggregation and routing protocol as per the set of communication standards 314 to mange flow aggregation and routing of data packets for the MCCD 102.

Figure 5:
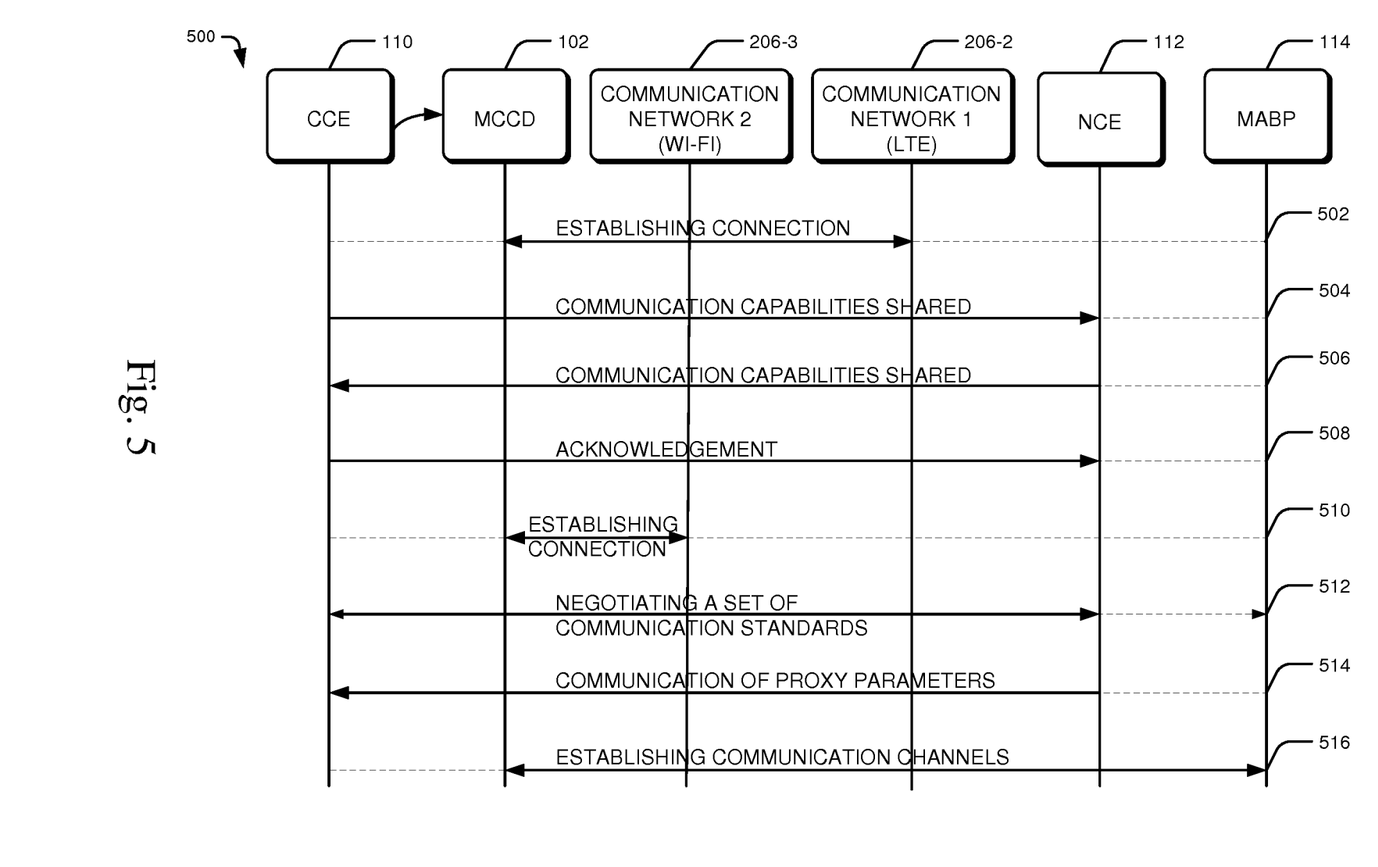
FIG. 5 illustrates a call-flow for managing flow aggregation and routing for a multi-connectivity client device, according to an implementation of the present subject matter.

FIG. 5 illustrates a call-flow for managing flow aggregation and routing for the MCCD 102, according to an implementation of the present subject matter. The foregoing description of the call-flow has been explained considering that the MCCD 102 includes a CCE 110, and the CCE 110 communicates with a NCE, such as the NCE 112. Further, the MCCD 102 may be communicating with two different communication networks, such as communication network 1 and communication network 2. For example, the communication network 1 may be a LTE communication network and the communication network 2 may be a Wi-Fi communication network.

In an example implementation of the present subject matter, the CCE 110 and the MCCD 102 communicating with the communication network 1 may communicate with LTE access node 206-2. Similarly, the CCE 110 and the MCCD 102 communicating with the communication network 1 may communicate with the Wi-Fi access node 206-3. Furthermore, the NCE is implemented an independent entity of the communication environment 106. To manage the flow aggregation and routing of data packets for the MCCD 102, a MABP may also be implemented within the communication environment 106.

It would be appreciated that various different network entities, such as including routers, bridges, gateways, computing devices, and storage devices, may be implemented in between the depicted entities, such as the MCCD 102 and the NCE 112, to enable exchange of data and messages, however, such details have been omitted for the sake of brevity.

In an example implementation, at step 502, the MCCD 102 communicates with the communication network 1 and may establish a connection. The connection with the communication network 1 may provide MCCD 102 with an IP address corresponding to the communication network 1, such as the LTE communication network, along with communication configuration for the communication network 1.

At step 504, the CCE 110 of the MCCD 102 communicates with the NCE 112 through predefined communication protocol. In an example, the CCE 110 may send XML messages through the user plane data, to the NCE 112. The CCE 110 may exchange the communication capabilities of the MCCD 102 with the NCE 112, at step 504. Further, the CCE 110 may also request the NCE 112 to share the communication capabilities of the MABP 114.

At step 506, the NCE 112 shares the communication capabilities of the MABP 114 with the CCE 110. The communication capabilities of the MABP 114, amongst other things, may at least include the flow aggregation and routing protocols supported by the MABP 114.

At step 508, the CCE 110 acknowledges the communication capabilities shared by the NCE 112 at step 506. The acknowledgement may complete a 3-way handshake between the CCE 110 and the NCE 112 leading to mutual authentication of the CCE 110 and the NCE 112.

At step 510, the MCCD 102 communicates with the communication network 2 and may establish a connection. The connection with the communication network 2 may provide MCCD 102 with an IP address corresponding to the communication network 2, such as that of the Wi-Fi communication network, along with communication configuration for the communication network 2.

At step 512, the CCE 110 and the NCE 112 negotiate a set of communication standards based on the communication capabilities of the MCCD 102 and the MABP 114. In an example implementation, the set of communication standards may include at least a flow aggregation and routing protocol for managing flow aggregation and routing of data packets for the MCCD 102.

At step 514, the NCE 112 shares the proxy parameters with the CCE 110, based on the negotiated set of communication standards. In an example implementation, the NCE 112 may also share MABP details with the CCE 110. The proxy parameters and the MABP details may allow the MCCD 102 to establish a connection with the MABP 114.

At step 516, the MCCD 102 establishes communication channels with the MABP 114. In an example implementation of the present subject matter, the MCCD 102 may establish an uplink and a downlink channel based on the flow aggregation and routing protocol included in the set of communication standards.

Figure 6:
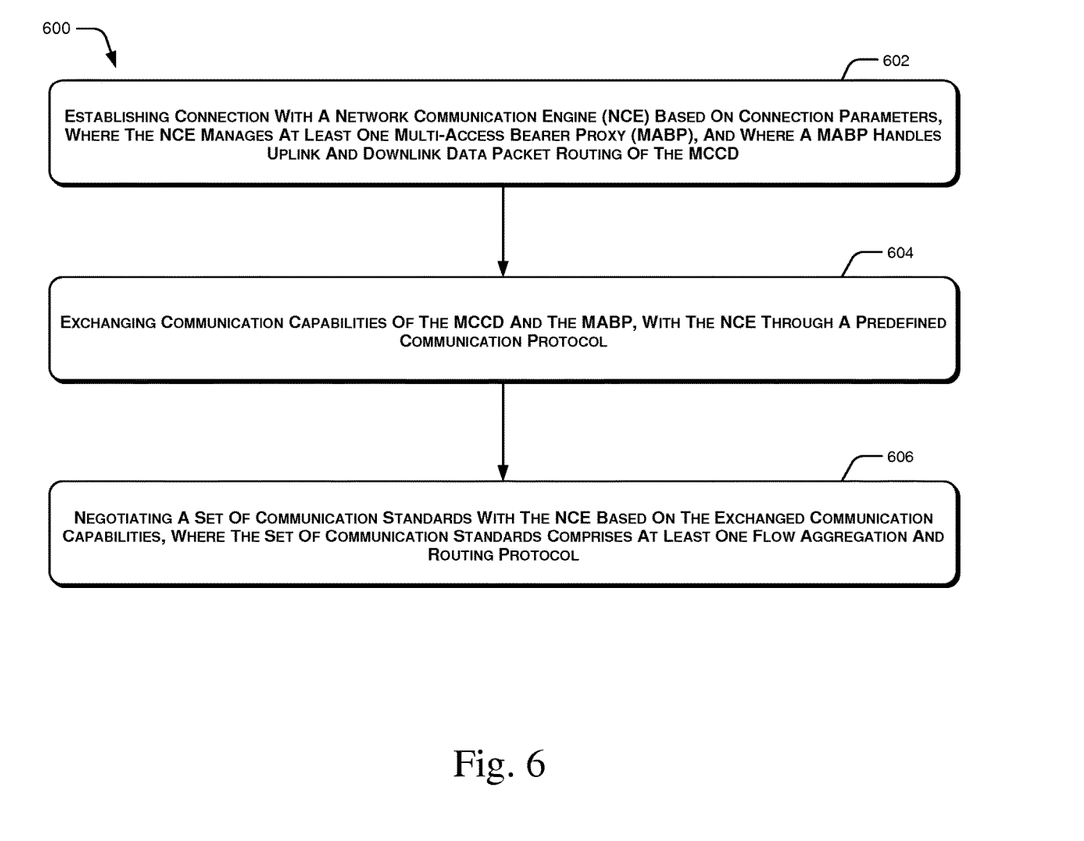
FIG. 6 illustrates a method for managing flow aggregation and routing for a multi-connectivity client device, according to an implementation of the present subject matter.
Figure 7:
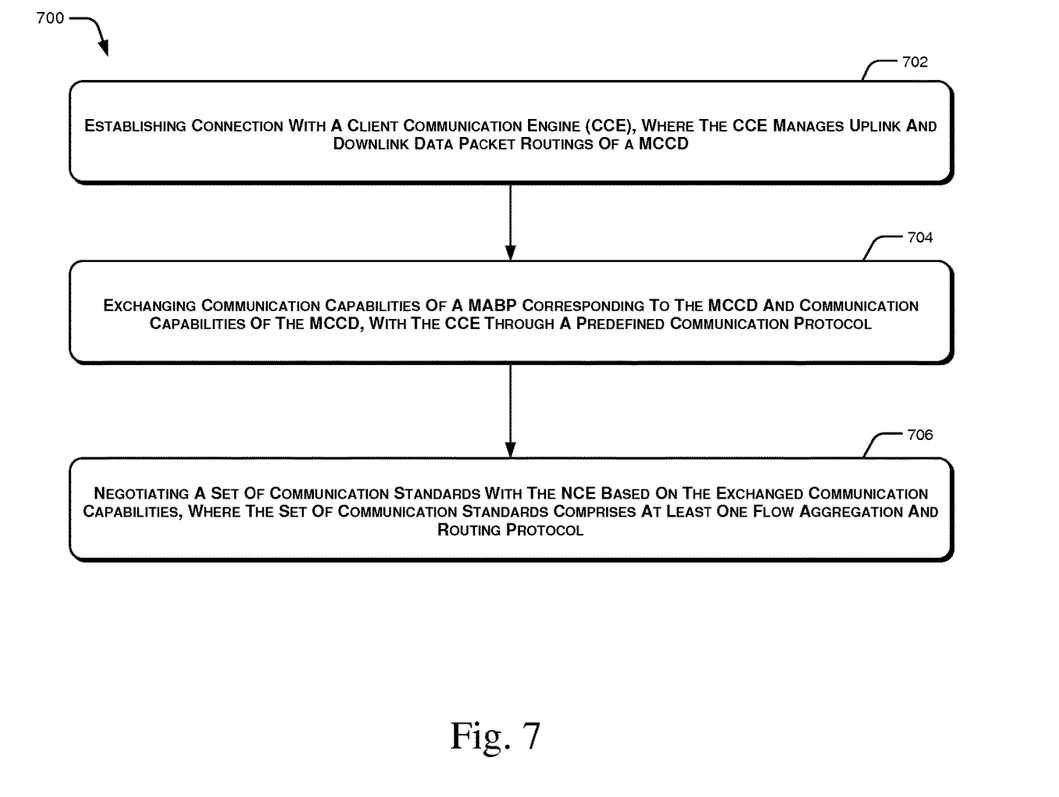
FIG. 7 illustrates a method for managing flow aggregation and routing between an access node and a multi-connectivity client device, according to an implementation of the present subject matter.

FIG. 6 and FIG. 7 illustrate a method 600 and a method 700 for managing flow aggregation and routing for a multi-connectivity client device. The order in which the methods 600 and 700 are described is not intended to be construed as a limitation, and any number of the described method blocks can be combined in any order to implement the methods 600 and 700, or an alternative method. Additionally, individual blocks may be deleted from the methods 600 and 700 without departing from the spirit and scope of the subject matter described herein. Furthermore, the methods 600 and 700 can be implemented in any suitable hardware, software, firmware, or combination thereof.

The methods 600 and 700 may be described in the general context of computer executable instructions. Generally, computer executable instructions can include routines, programs, objects, components, data structures, procedures, modules, functions, etc., that perform particular functions or implement particular abstract data types. The methods 600 and 700 may also be practiced in a distributed computing environment where functions are performed by remote processing devices that are linked through multiple communication networks.

A person skilled in the art will readily recognize that steps of the methods 600 and 700 can be performed by network entities, communicating in a communication environment. Herein, some implementations are also intended to cover program storage devices, for example, digital data storage media, which are machine or computer readable and encode machine-executable or computer-executable programs of instructions, wherein said instructions perform some or all of the steps of the described methods 600 and 700. The program storage devices may be, for example, digital memories, magnetic storage media, such as a magnetic disks and magnetic tapes, hard drives, or optically readable digital data storage media. The implementations are also intended to cover all the communication networks and communication devices configured to perform said steps of the methods 600 and 700.

In an implementation, the method 600 may be performed by client communication engine, such as the CCE 110 implemented within the MCCD 102. For the sake of brevity of description of FIG. 6, the different components performing the various steps of the method 600 are not described in detail. Such details are provided in the description provided with reference to FIG. 1, FIG. 2. FIG. 4, and FIG. 5.

Referring to FIG. 6, at block 602 a connection with a network communication engine (NCE) is established. In an example implementation of the present subject matter, the connection is established based on connection parameters. The NCE may manage a MABP, while the MABP may handle the uplink and downlink data packet routing of the MCCD. Further, the connection with the NCE may be established by exchanging XML messages through a user plane data.

At block 604, communication capabilities of the MCCD and the MABP are exchanged with the NCE. The communication capabilities, amongst other things, may include flow aggregation and routing protocols supported by the MCCD and the MABP.

At block 606, a set of communication standards may be negotiated with the NCE based on the communication capabilities of the MCCD and the MABP. The set of communication standards, amongst other things, may include a flow aggregation and routing protocol. The flow aggregation and routing protocol may be utilized by the CCE and the MABP to manage flow aggregation and routing for the MCCD.

Referring to FIG. 7, at block 702, a connection with a client connection engine is established. The connection may be established by exchanging XML messages through a user plane data.

At block 704, communication capabilities of a MABP corresponding to a MCCD, and communication capabilities of the MCCD are exchanged with the CCE. In an example implementation of the present subject matter, the exchange of the communication capabilities is also completed using the XML messages through the user plane data.

At block 706, a set of communication standards are negotiated with the CCE, based on the exchanged communication capabilities of the MABP and the MCCD. In an example implementation of the present subject matter, amongst other things, the set of communication standards includes a flow aggregation and routing protocol.

The above described methods 600 and 700 may allow the CCE and the NCE to negotiate a set of communication standards, which may allow the MABP to handle uplink and downlink data packet routing for the MCCD.

Although implementations of the present subject matter have been described in a language specific to structural features and/or methods, it is to be understood that the appended claims are not necessarily limited to the specific features or methods described. Rather, the specific features and methods are disclosed as examples of the present subject matter.

We claim:

1. A method for managing flow aggregation and routing of data packets for a multi-connectivity client device, the method comprising:
   establishing, by a client connection engine of the multi-connectivity client device that supports a plurality of different flow aggregation and routing protocols, a connection with a network communication engine based on connection parameters, wherein the network communication engine manages a multi-access bearer proxy, wherein the multi-access bearer proxy handles uplink and downlink data packet routing of the client device and wherein the multi-access bearer proxy supports one or more flow aggregation and routing protocols;
   transmitting information regarding communication capabilities of the client device to the network communication engine and receiving information regarding communication capabilities of the multi-access bearer proxy from the network communication engine through a predefined communication protocol; and
   determining, in conjunction with said network communication engine and based on the transmitted and received information regarding communication capabilities, a set of communication standards for managing the flow aggregation and routing of data packets, wherein said determining includes determining flow aggregation and routing protocols that are common to (i) the plurality of different flow aggregation and routing protocols supported by the multi-connectivity client device and (ii) the one or more flow aggregation and routing protocols supported by the multi-access bearer proxy, and
   selecting for the set of communication standards to comprise at least one common flow aggregation and routing protocol.

2. The method as claimed in claim 1, further comprising receiving proxy parameters corresponding to the determined set of communication standards, and wherein the proxy parameters include at least parameters corresponding to the at least one common flow aggregation and routing protocol.

3. The method as claimed in claim 2, further comprising communicating with the multi-access bearer proxy to setup a connection corresponding to the at least one common flow aggregation and routing protocol, wherein the communicating comprises at least sharing values corresponding to the multi-access bearer proxy parameters.

4. The method as claimed in claim 1, wherein the at least one common flow aggregation and routing protocol is one of a generic routing encapsulation tunneling protocol and a multipath transmission protocol.

5. The method as claimed in claim 1, wherein the connection parameters comprise at least one of link quality, distance from the client device, and pre-provisioned entry.

6. A method performed by a network communication engine for managing flow aggregation and routing of data packets for a multi-connectivity client device, the method comprising:
   establishing a connection with a client connection engine of the multi-connectivity client device that supports multiple different flow aggregation and routing protocols, wherein the client connection engine manages uplink and downlink data packet routings of the client device;
   transmitting information regarding communication capabilities of a multi-access bearer proxy corresponding to the client device toward the client connection engine and receiving information regarding communication capabilities of the client device from the client connection engine through a predefined communication protocol, wherein the multi-access bearer proxy supports one or more flow aggregation and routing protocols; and determining, in conjunction with the client connection engine, a set of communication standards for managing the flow aggregation and routing of data packets, based on the transmitted and received information regarding communication capabilities, wherein said determining includes determining flow aggregation and routing protocols that are common to (i) the plurality of different flow aggregation and routing protocols supported by the multi-connectivity client device and (ii) the one or more flow aggregation and routing protocols supported by the multi-access bearer proxy, and selecting for the set of communication standards to comprise at least one common flow aggregation and routing protocol.

7. The method as claimed in claim 6, further comprising communicating the at least one common flow aggregation and routing protocol to the multi-access bearer proxy for establishing uplink and downlink channels for the client device.

8. The method as claimed in claim 6, further comprising transmitting proxy parameters corresponding to the determined set of communication standards towards the client connection engine, wherein the proxy parameters include at least parameters corresponding to the common at least one flow aggregation and routing protocol.

9. The method as claimed in claim 6, wherein the communication capabilities of the multi-access bearer proxy comprise a flow aggregation and routing protocol for distribution of data packets between the client device and the proxy.

10. The method as claimed in claim 6, wherein the set of communication standards further comprises a configuration mode, the configuration mode defining a combination of a core network, and an uplink access and a downlink access utilized for routing of data packets.

11. A multi-connectivity client device comprising:
at least one processor;
at least one memory including computer program code, the at least one memory and computer program code configured to, with the at least one processor, cause the multi-connectivity client device to at least exchange data with an associated target terminal;
a client connection engine implemented with or coupled to the at least one processor, the client connection engine being configured to:
establish a connection with a network communication engine based on connection parameters, wherein the network communication engine is configured to manage a multi-access bearer proxy, wherein the multi-access bearer proxy is configured to handle uplink and downlink data packet routing of the client device, and wherein the multi-access bearer proxy is configured to support one or more flow aggregation and routing protocols;
transmit information regarding communication capabilities of the client device including information identifying a plurality of different flow aggregation and routing protocols supported by the client device and receive information regarding communication capabilities of the multi-access bearer proxy from the network communication engine through a predefined communication protocol; and
determine, in conjunction with the network communication engine, a set of communication standards for managing flow aggregation and routing of data packets, based on the transmitted and received information regarding communication capabilities, wherein the set of communication standards comprises at least one flow aggregation and routing protocol.

12. The client device as claimed in claim 11, wherein the client connection engine is further configured to report available network links and paths and link quality of available network links and paths, for routing of data packets toward the network communication engine.

13. A network connection engine for managing a multi-access bearer proxy corresponding to a multi connectivity client device, the network connection engine comprising:
at least one network connection engine processor;
at least one memory including computer program code, the at least one memory and the computer program code configured to, with the at least one network connection processor, cause the network connection engine to at least manage an associated multi-access bearer proxy;
a communication module implemented with or coupled to the at least one network connection processor, the communication module being configured to:
establish a connection with a client connection engine of the client device, the client device being configured to support a plurality of different flow aggregation and routing protocols, wherein the client connection engine is configured to manage uplink and downlink data packet routings of the client device; and
transmit information regarding communication capabilities of the multi-access bearer proxy toward the client connection engine and receive information regarding communication capabilities of the client device from the client connection engine through a predefined communication protocol; and
a negotiating module implemented with or coupled to the at least one network connection processor, the negotiating module being configured to determine, in conjunction with the client connection engine, a set of communication standards for managing flow aggregation and routing of data packets based on the transmitted and received information regarding communication capabilities;
wherein said determining includes determining flow aggregation and routing protocols which are common to (i) the plurality of different flow aggregation and routing protocols supported by the client device and (ii) the one or more flow aggregation and routing protocols supported by the multi-access bearer proxy and selecting for the set of communication standards to comprises at least one flow aggregation and routing protocol.

14. The network communication engine as claimed in claim 13, wherein the at least one common flow aggregation and routing protocol is one of a generic routing encapsulation tunneling protocol and a multipath transmission protocol.

15. The network communication engine as claimed in claim 13, the network communication engine being further configured to transmit proxy details toward the client connection engine for establishing uplink and downlink channels.

* * * * *